US009699290B2

(12) United States Patent
Lee (10) Patent No.: US 9,699,290 B2
(45) Date of Patent: Jul. 4, 2017

(54) COMMUNICATION MODULE, VEHICLE INCLUDING THE SAME, AND METHOD FOR CONTROLLING THE VEHICLE

(71) Applicant: HYUNDAI MOTOR COMPANY, Seoul (KR)

(72) Inventor: Jeongtae Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/074,662

(22) Filed: Mar. 18, 2016

(65) Prior Publication Data

US 2017/0134554 A1     May 11, 2017

(30) Foreign Application Priority Data

Nov. 5, 2015   (KR) .......................... 10-2015-0155159

(51) Int. Cl.
   *H04M 3/00*   (2006.01)
   *H04M 1/725*   (2006.01)
   (Continued)

(52) U.S. Cl.
   CPC ........ *H04M 1/72527* (2013.01); *H04L 12/46* (2013.01); *H04L 12/66* (2013.01); *H04L 67/12* (2013.01)

(58) Field of Classification Search
   CPC ..... H04W 4/046; H04W 12/06; H04W 12/08; H04W 36/0005; H04W 36/32;
   (Continued)

(56) References Cited

U.S. PATENT DOCUMENTS 6,480,103 B1* 11/2002 McCarthy ................ B60Q 3/06
                                                    340/425.5
7,164,117 B2* 1/2007 Breed ............... B60R 21/01516
                                                    250/208.1
(Continued)

FOREIGN PATENT DOCUMENTS

KR   10-2006-0063423 A   6/2006
KR   10-2009-0095326 A   9/2009
(Continued)

*Primary Examiner* — Joseph Arevalo
(74) *Attorney, Agent, or Firm* — McDermott Will & Emery LLP (57) ABSTRACT

A communication module, a vehicle including the same, and a method for controlling the vehicle can solve a timing issue encountered when signals for the same service are communicated between different communication schemes, thereby guaranteeing stability in a telematics remote service. The vehicle includes a first communication unit configured to perform wired communication; a second communication unit configured to perform wireless communication to receive a remote signal; a control unit configured to generate a communication signal by adding a wake-up signal to a drive command signal of the received remote signal upon receiving the remote signal from the second communication unit, and to transmit the generated communication signal to the first communication unit; and a drive unit configured to receive the communication signal from the first communication unit, and to drive load on the basis of a drive command signal of the received communication signal.

17 Claims, 9 Drawing Sheets

(51) Int. Cl.
*H04L 29/08* (2006.01)
*H04L 12/46* (2006.01)
*H04L 12/66* (2006.01)

(58) Field of Classification Search
CPC . H04W 36/34; H04W 12/04; H04W 52/0251; H04W 52/0261; H04W 56/001
USPC ......... 455/456, 420, 39, 41.1, 41.3, 73, 574, 455/423
See application file for complete search history.

(56) References Cited

U.S. PATENT DOCUMENTS

| | | | | |
|---|---|---|---|---|
| 7,636,626 | B2* | 12/2009 | Oesterling | G01C 21/00 340/901 |
| 8,725,311 | B1* | 5/2014 | Breed | G08B 21/06 600/300 |
| 9,187,061 | B2* | 11/2015 | Grimm | B60R 25/1001 |
| 9,241,249 | B2* | 1/2016 | Yang | H04W 4/22 |
| 2004/0198466 | A1* | 10/2004 | Walby | G06F 1/3209 455/574 |
| 2005/0052286 | A1* | 3/2005 | Perraud | B60C 23/0413 340/12.22 |
| 2005/0215274 | A1* | 9/2005 | Matson | G06F 1/3203 455/522 |
| 2006/0208169 | A1* | 9/2006 | Breed | B60N 2/002 250/221 |
| 2006/0217875 | A1* | 9/2006 | Oesterling | G01C 21/00 701/34.4 |
| 2007/0262574 | A1* | 11/2007 | Breed | B60R 1/00 280/735 |
| 2008/0036580 | A1* | 2/2008 | Breed | B60R 21/01536 340/438 |
| 2008/0157940 | A1* | 7/2008 | Breed | B60C 11/24 340/425.5 |
| 2008/0236275 | A1* | 10/2008 | Breed | B60C 11/24 73/290 V |
| 2008/0306681 | A1* | 12/2008 | Piwowarski | G01C 21/362 701/408 |
| 2009/0046538 | A1* | 2/2009 | Breed | B60C 11/24 367/93 |
| 2009/0049220 | A1* | 2/2009 | Conti | G06F 13/24 710/267 |
| 2009/0298555 | A1* | 12/2009 | Matson | G06F 1/3203 455/574 |
| 2010/0100441 | A1* | 4/2010 | Oesterling | G06Q 30/0254 705/14.52 |
| 2013/0211623 | A1* | 8/2013 | Thompson | G07C 5/008 701/2 |
| 2013/0283530 | A1* | 10/2013 | Main | A47C 31/12 5/600 |
| 2014/0267022 | A1* | 9/2014 | Kim | G06F 3/01 345/156 |
| 2014/0267104 | A1* | 9/2014 | Ahmed | G06F 3/041 345/173 |
| 2014/0276090 | A1* | 9/2014 | Breed | A61B 5/18 600/473 |
| 2014/0277837 | A1* | 9/2014 | Hatton | B60R 25/24 701/2 |
| 2014/0309813 | A1* | 10/2014 | Ricci | B60Q 1/00 701/2 |
| 2014/0309862 | A1* | 10/2014 | Ricci | G01C 21/00 701/36 |
| 2014/0310788 | A1* | 10/2014 | Ricci | B60Q 1/00 726/6 |
| 2015/0031394 | A1* | 1/2015 | Yang | H04W 4/22 455/456.2 |
| 2015/0109116 | A1* | 4/2015 | Grimm | B60R 25/1001 340/426.18 |
| 2015/0372496 | A1* | 12/2015 | Lee | H02J 50/40 307/104 |
| 2015/0375395 | A1* | 12/2015 | Kwon | A47L 9/2857 700/245 |
| 2016/0021611 | A1* | 1/2016 | Wong | H04W 56/001 370/311 |
| 2016/0127473 | A1* | 5/2016 | Khan | H04L 67/12 455/66.1 |
| 2016/0173939 | A1* | 6/2016 | Iwami | H04N 21/431 725/139 |
| 2016/0231430 | A1* | 8/2016 | Wilson | G01S 19/51 |
| 2016/0247377 | A1* | 8/2016 | Ricci | B60Q 1/00 |
| 2016/0288744 | A1* | 10/2016 | Rutherford | B60L 1/00 |
| 2016/0300417 | A1* | 10/2016 | Hatton | G07C 9/00896 |
| 2016/0325710 | A1* | 11/2016 | Honkanen | B60R 25/2081 |
| 2016/0342406 | A1* | 11/2016 | Ahmed | G06F 9/4443 |
| 2016/0345113 | A1* | 11/2016 | Lee | H04R 29/001 |

FOREIGN PATENT DOCUMENTS

| | | |
|---|---|---|
| KR | 10-2010-0021942 A | 2/2010 |
| KR | 10-2013-0101600 A | 9/2013 |
| KR | 10-2013-0134582 A | 12/2013 |
| KR | 10-1509596 B1 | 4/2015 |
| KR | 10-2015-0060094 A | 6/2015 |

* cited by examiner

COMMUNICATION MODULE, VEHICLE INCLUDING THE SAME, AND METHOD FOR CONTROLLING THE VEHICLE

CROSS-REFERENCE TO RELATED APPLICATION

This application claims the benefit of Korean Patent Application No. 10-2015-0155159, filed on Nov. 5, 2015 in the Korean Intellectual Property Office, the disclosure of which is incorporated herein by reference.

TECHNICAL FIELD

Embodiments of the present disclosure relate to a communication module configured to prevent occurrence of a communication error, a vehicle including the communication module, and a method for controlling the vehicle.

BACKGROUND

A vehicle is an apparatus to move on the road by driving of vehicle wheels for the purpose of transporting persons or cargo.

A vehicle can perform basic traveling functions and additional functions for user convenience, for example, an audio function, a video function, a navigation function, an air-conditioning control function, a seat heater control function, a function for communicating with an external terminal, etc.

The vehicle may include a heat unit configured to control additional functions, and may further include an input/output (I/O) device configured to input/output operation information of the additional functions.

The vehicle may further include a communication module to communicate with a server, a base station (BS), and a user equipment (UE) acting as an external terminal, may transmit and receive information to and from the server and the external terminal using the communication module, and may output the received information through a speaker, a display unit, and a vehicle terminal.

In this case, the communication module may use at least one of a wired communication scheme and a wireless communication scheme.

Specifically, a communication module configured to perform wireless communication is referred to as a telematics unit.

The telematics unit may basically include a wireless modem to access a wireless communication network, and may provide a Radio Frequency (RF) data service implemented by a joint production between a vehicle manufacturing company and a mobile communication enterprise.

A mode transition time in which the CAN communication unit awakes and then switches to a sleep mode is much shorter than a signal reception time needed when the above-mentioned vehicle transmits a remote signal of the telematics unit to a plurality of CAN communication units during a standby mode in which the vehicle stops driving, such that it is impossible for the above-mentioned conventional vehicle to transmit a remote signal to a destination.

That is, the CAN communication unit contained in the communication module awakes and then switches to the sleep mode rapidly. As a result, another CAN communication unit switches to the sleep mode while one CAN communication unit receives signals, such that it is impossible to transmit the signals received by the one CAN communication unit to the other CAN communication unit.

SUMMARY

Therefore, it is an aspect of the present disclosure to provide a vehicle including a control unit configured to transmit a signal for waking-up (or awaking) another CAN communication unit just before one CAN communication unit transmits a drive command signal of a remote signal to the other CAN communication unit through a gateway during the standby mode, and a method for controlling the vehicle.

It is another aspect of the present disclosure to provide a communication module including a gateway configured to periodically transmit a predetermined number of wake-up signals just before one CAN communication unit transmits a drive command signal of a remote signal to another CAN communication unit upon receiving the remote signal from the one CAN communication unit during the standby mode, a vehicle including the same, and a method for controlling the vehicle.

Additional aspects of the disclosure will be set forth in part in the description which follows and, in part, will be obvious from the description, or may be learned by practice of the disclosure.

In accordance with an aspect of the present disclosure, a vehicle includes: a first communication unit configured to perform wired communication; a second communication unit configured to perform wireless communication to receive a remote signal; a control unit configured to generate a communication signal by adding a wake-up signal to a drive command signal of the received remote signal upon receiving the remote signal from the second communication unit, and to transmit the generated communication signal to the first communication unit; and a drive unit configured to receive the communication signal from the first communication unit, and to drive load on the basis of a drive command signal of the received communication signal.

The control unit may determine a specific time before a predetermined time on the basis of a transmission time of the drive command signal to be a transmission time of the wake-up signal.

The control unit may generate a predetermined number of communication signals, each of which includes the wake-up signal and the drive command signal.

The control unit may awake upon reception of the remote signal, and may then transmit a wake-up signal to the first communication unit.

The first communication unit may include: a gateway; a first CAN communication unit configured to interconnect the control unit and the gateway; and a second CAN communication unit configured to interconnect the drive unit and the gateway.

The gateway may receive a communication signal from the first CAN communication unit, and transmit a wake-up signal contained in the communication signal to a second CAN communication unit.

After lapse of a predetermined time after the gateway transmits the wake-up signal, the gateway may transmit the drive command signal to the second CAN communication unit.

The gateway may further transmit a predetermined number of communication signals to a second CAN communication unit at intervals of a predetermined time.

The second CAN communication unit may perform a wake-up operation upon receiving the wake-up signal, and may transmit a drive command signal to the drive unit upon receiving the drive command signal.

Each of the first CAN communication unit and the second CAN communication unit may include a communication speed equal to or less than a predetermined speed.

The first CAN communication unit may transmit a copied signal obtained by duplication of the communication signal.

The remote signal may include any one of a remote starting signal, a remote door opening/closing signal, a remote air-conditioning adjustment signal, and a remote lighting signal.

In accordance with another aspect of the present disclosure, a communication module includes: a first CAN communication unit connected to an external control unit for receiving a remote signal, configured to receive a communication signal from the control unit; a second CAN communication unit connected to drive a load; and a gateway connected to the first CAN communication unit and the second CAN communication unit, configured to receive the communication signal from the first CAN communication unit, and to transmit the received communication signal to the second CAN communication unit, wherein the communication signal includes the wake-up signal and a load drive command signal contained in the remote signal.

The gateway may transmit the wake-up signal to the second CAN communication unit, and may transmit the drive command signal after lapse of a predetermined time.

In accordance with another aspect of the present disclosure, a communication module includes: a gateway; a first CAN communication unit configured to awake by an external control unit, to receive a drive command signal from the control unit, and to transmit the received drive command signal to the gateway; and a second CAN communication unit configured to connect a drive unit for driving a load to the gateway, wherein the gateway generates a wake-up signal upon receiving the drive command signal, transmits the generated wake-up signal to the second CAN communication unit, and transmits the received drive command signal to the second CAN communication unit after lapse of a predetermined time.

The gateway may further transmit a wake-up signal and a drive command signal to the second CAN communication unit at intervals of the predetermined time.

Each of the first CAN communication unit and the second CAN communication unit may include a communication speed equal to or less than a predetermined speed.

The second CAN communication unit may perform a wake-up operation upon receiving the wake-up signal, and may transmit the received drive command signal to the drive unit upon receiving the drive command signal.

The gateway may retransmit the wake-up signal when the second CAN communication unit is deactivated.

In accordance with another aspect of the present disclosure, a method for controlling a vehicle which includes a first communication unit to perform wired communication and a second communication unit to perform wireless communication so as to receive a remote signal includes: generating a communication signal by adding a wake-up signal to a drive command signal of the received remote signal upon receiving the remote signal from the second communication unit; and transmitting the communication signal to a gateway of the first communication unit using a first CAN communication unit of the first communication unit.

The method may further include: upon receiving the communication signal, transmitting, by the gateway, the received communication signal to a second CAN communication unit of the first communication unit; and transmitting, by the second CAN communication unit, the communication signal to a drive unit of a load.

The transmitting the communication signal to the second CAN communication unit of the first communication unit may include: transmitting a wake-up signal contained in the communication signal to the second CAN communication unit; and after lapse of a predetermined time, transmitting a drive command signal contained in the communication signal to the second CAN communication unit.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
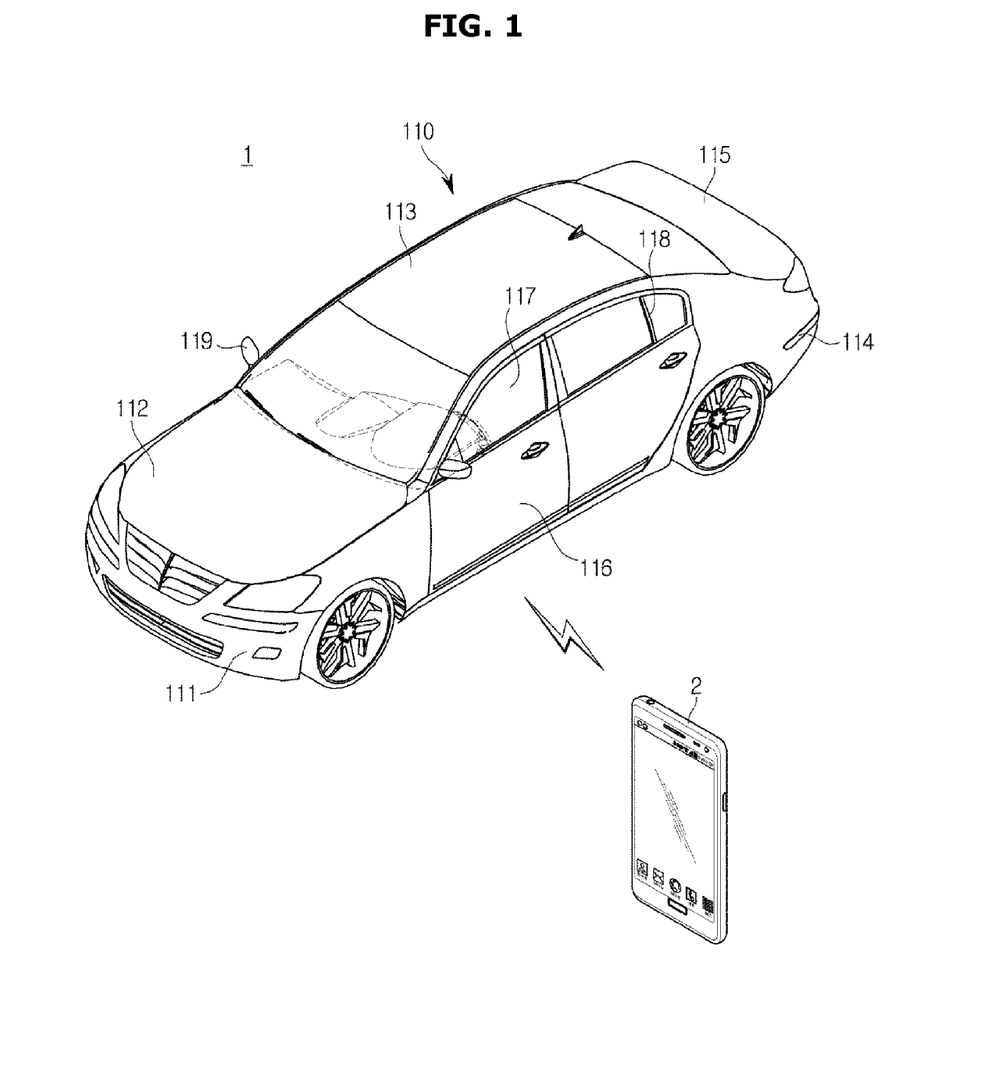
FIG. 1 is a view illustrating an appearance of a vehicle according to an embodiment of the present disclosure.
Figure 2:
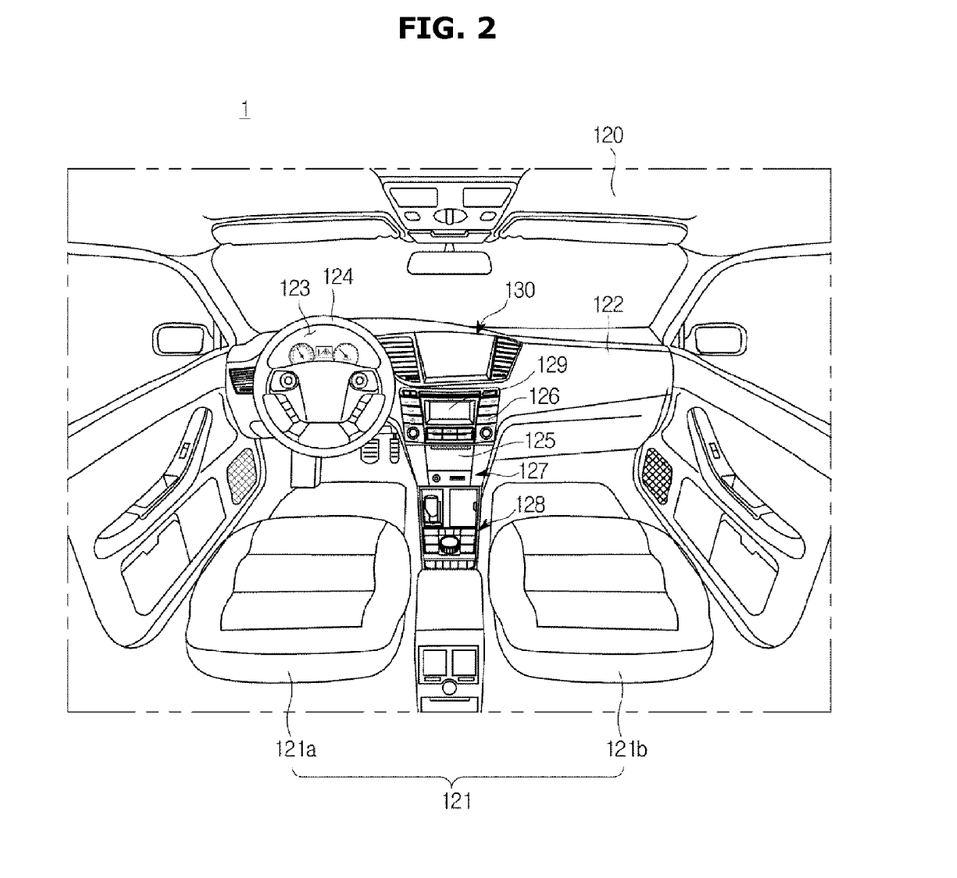
FIG. 2 is a view illustrating an internal structure of the vehicle according to an embodiment of the present disclosure.

FIG. 1 is a view illustrating an appearance of a vehicle according to an embodiment of the present disclosure. FIG. 2 is a view illustrating an internal structure of the vehicle according to an embodiment of the present disclosure.

A vehicle 1 is an apparatus to move on the road by driving of vehicle wheels for the purpose of transporting persons or cargo.

The vehicle 1 may include a body having interior and exterior parts, and a chassis which is a remaining portion other than the body and is equipped with mechanisms required for driving thereof.

Referring to FIG. 1, the exterior part 110 of the body may include a front panel 111, a bonnet 112, a roof panel 113, a rear panel 114, a trunk 115, and front-rear and left-right doors 116.

The exterior part 110 of the body may further include window glasses 117 installed at the front-rear and left-right doors 116, and pillars 118 provided at boundaries between the front-rear and left-right doors 116.

The exterior part 110 of the vehicle may further include side-view mirrors 119 to provide a rear view of the vehicle 1 to a vehicle driver.

Referring to FIG. 2, the interior part 120 of the vehicle includes seats (121:121a, 121b) on which a passenger sits, a dashboard 122, an instrument panel 123 (i.e., a cluster) (including a tachometer, a speedometer, a coolant thermometer, a fuel gauge, a turn signal indicator, a high beam indicator light, a warning light, a seat belt warning light, a mileage indicator, an odometer, an automatic transmission shift indicator, a door open warning light, an engine oil warning light, a low fuel warning light, which are arranged on the dashboard to output information related to driving), a steering wheel 124 to adjust a traveling direction of the vehicle, and a center fascia 125 extended from the dashboard 122 to the vicinity of the seats 121.

The seats 121 may include a driver's seat 121a for a driver, a passenger seat 121b for a fellow passenger, and a rear seat arranged in the rear of the vehicle 1.

The seats 121 may include heating elements therein.

The center fascia 125 may include a head unit 125 disposed between the driver's seat 121a and the passenger seat 121b from among the dashboard 122.

That is, the head unit 126 may be connected to a variety of loads needed to perform various functions (e.g., an audio function, a radio function, an air-conditioning function, a heating function of the seats, a navigation function, a DMB function, a telephone function, etc.), such that the head unit 126 may receive an operation command for performing each function, may control respective functions according to the received operation command or may transmit the operation command to the corresponding load.

The center fascia 125 may include an air vent, a cigarette lighter receptacle, a multi-port 127, etc. therein.

The multi-port 127 may be located adjacent to the head unit 126, and may further include a USB port, an AUX port, and a Secure Digital (SD) slot.

The vehicle 1 may further include an input unit 128 configured to receive an operation command of at least one function from among a plurality of functions capable of being executed in the vehicle 1. The vehicle 1 may further include a display unit 129 configured to display not only information regarding the executed function but also user-input information.

The input unit 128 may be provided in the head unit 126, and may include an ON-OFF button of respective functions and at least one physical button (such as a button for changing the setting values of respective functions).

When a user is located outside of the vehicle, the input unit 128 may receive a remote mode for receiving an operation command from the user.

The input unit 128 may be provided in the center fascia 125. In this case, the input unit 128 may be implemented as a jog dial (not shown) or touchpad through which the user can input a movement command of a cursor displayed on the display unit of the terminal 130, a selection command, etc.

In this case, the display unit 129 may display ON/OFF states of the remote mode.

The display unit 129 may be implemented as a flat panel display, for example, a Liquid Crystal Display (LCD) panel, a Light Emitting Diode (LED) panel, an Organic Light Emitting Diode (OLED) panel, etc., without being limited thereto.

The center fascia 125 may include a vehicle's terminal (or UE) 130 (such as a user interface (UI)) for receiving information from the user and outputting the result corresponding to the user-input information.

The terminal 130 (or UE) may include an input unit and a display unit. If at least one of a navigation function, a DMB function, an audio function, a video function, a telephone function, and a radio function is selected, the terminal 130 may perform the selected function and may display operation information of the executed function.

The input unit of the terminal 130 may include a touch panel incorporated with the display unit of the terminal 130.

The input unit of the terminal 130 may be implemented as a button and then displayed on the display unit of the terminal. In this case, the input unit of the terminal 130 may receive position information of the displayed button.

The input unit and the display unit of the terminal 130 may be implemented as a touchscreen.

A stationary-type terminal may be installed on the dashboard.

The chassis of the vehicle may further include a power generation system, a power transmission system, a traveling system, a steering system, a brake system, a suspension system, a speed change system, a fuel supply device, and front-rear and left-right wheels.

The vehicle 1 may further include an ignition button configured to input an operation command to the starter motor (not shown).

That is, if the ignition button is switched on, the vehicle 1 may operate the starter motor (not shown), and may drive the engine (not shown) acting as the power generation device using the starter motor.

The vehicle 1 may include a power generation system, a power transmission system, a traveling system, a steering system, a brake system, a suspension system, a speed change system, a fuel supply device, and an electronic control unit (ECU) for controlling driving of various safety devices and various sensors.

In this case, the ECU may be provided per device, and may be implemented as one integrated unit capable of simultaneously controlling a plurality of devices.

The vehicle 1 may include a communication module 140 configured to perform wired communication between various electronic devices embedded therein.

The communication module 140 may be configured to perform location tracking, Internet access, remote vehicle diagnosis, accident sensing, transportation information, and a communication service related to a home network over a communication and broadcast network.

The communication module 140 may communicate with the terminal 2 acting as a user equipment (UE), and may communicate with a server (not shown) through a base station (BS).

The communication module 140 may include a first communication unit for wired communication and a second communication unit for wireless communication.

In this case, the first communication unit may include a plurality of CAN communication units and a USB communication unit, and the second communication unit may include a Wi-Fi communication module and a Bluetooth communication unit.

The communication module 140 may further include a GPS reception module to acquire position information from a satellite, and may further include a broadcast communication module such as a DMB Transport Protocol Experts Group (TPEG), SXM, or RDS module.

The vehicle 1 may further include a power-supply unit 150 electrically connected to various electronic devices such that the driving power is supplied to the electronic devices. For example, the electronic devices may include a terminal (or UE), an audio device, interior lighting, heating elements of the seats, a starter motor, a communication module, headlights, an ECU, and other electronic devices.

The power-supply unit 150 is a chargeable/dischargeable battery, and performs charging using a generator or engine power during vehicle traveling.

The starter motor may be driven by an external remote signal.

The vehicle may further include a remote controller to operate the starter motor remotely.

The vehicle may also receive a remote signal to operate at least one load by communicating with the terminal 2.

The terminal 2 may be a user equipment (UE) communicating with the vehicle.

The user equipment (UE) 2 may include a program needed to control the vehicle remotely, and may remotely control the vehicle by execution of this program.

That is, the UE 2 may be a tablet PC, a mobile phone, a smartphone, a laptop, or a PDA.

Constituent components of the vehicle will hereinafter be described with reference to FIG. 3.

Figure 3:
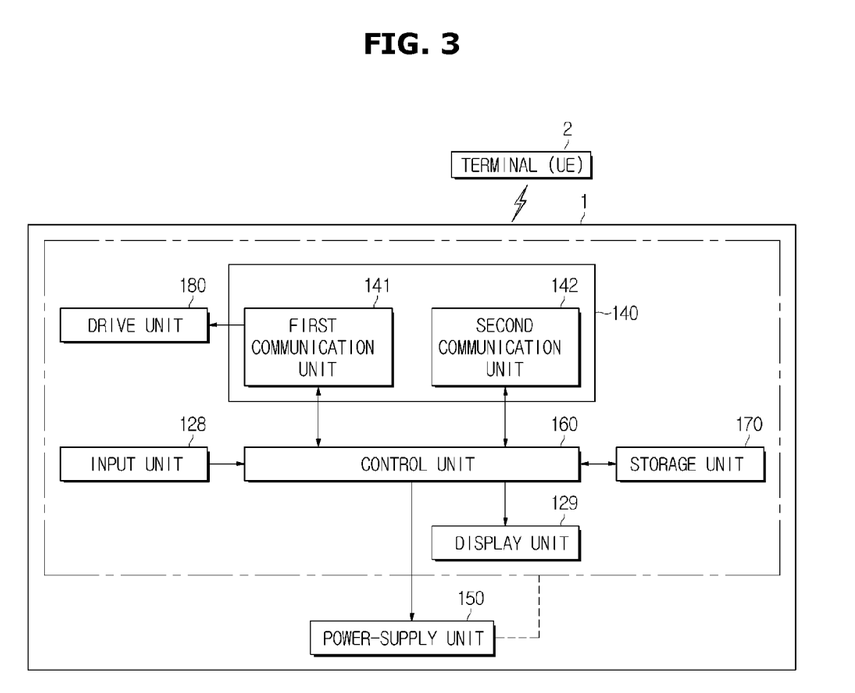
FIG. 3 is a block diagram illustrating a vehicle according to an embodiment of the present disclosure.
Figure 4:
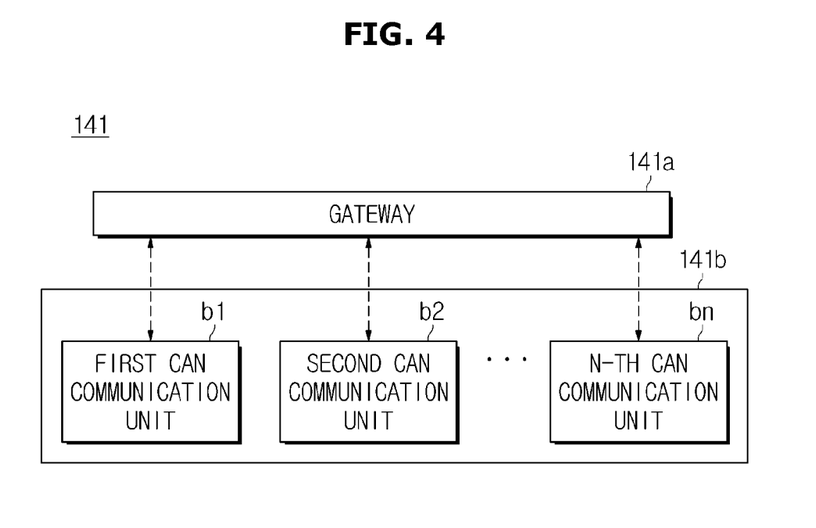
FIG. 4 is a detailed block diagram illustrating a first communication unit embedded in a vehicle according to an embodiment of the present disclosure.

FIG. 3 is a block diagram illustrating a vehicle according to an embodiment of the present disclosure. FIG. 4 is a detailed block diagram illustrating the first communication unit embedded in the vehicle according to an embodiment of the present disclosure.

Referring to FIG. 3, the vehicle 1 may include an input unit 128, a display unit 129, a communication module 140, a power-supply unit 150, a control unit 160, a storage unit 170, and a drive unit 180.

The input unit 128 may allow the user to select the remote service mode configured to remotely drive various loads embedded in the vehicle.

The display unit 129 may display whether the remote service mode operates (or is switched on or off).

The communication module 140 may include a first communication unit 141 for wired communication and a second communication unit 142 for wireless communication.

The first communication unit 141 may be connected not only to respective drive units 180 for driving various loads of the vehicle but also to the control unit 160 by wire, and may transmit a drive signal received from the control unit 160 to the respective drive units by wire.

Referring to FIG. 4, the first communication unit 141 may include a gateway 141*a* and a CAN communication unit 141*b* connected to the gateway 141*a*.

If the vehicle stop driving, the gateway 141*a* and a plurality of CAN communication units (141*b*:b1, b2, . . . , bn) of the first communication unit 141 may stop operation, but can be activated upon receiving the wake-up signal from the external part.

In more detail, the gateway 141*a* may be connected to the control unit 160, and may transmit a communication signal received from the control unit 160 to the corresponding CAN communication unit 141*b*.

The gateway 141*a* may be connected to the control unit 160 through the first CAN communication unit (b1). Upon receiving the communication signal through the first CAN communication unit (b1), the gateway 141*a* may transmit the received communication signal to the second CAN communication unit (b2).

In this case, the communication signal may include not only a load drive command signal contained in the remote signal, but also a wake-up signal.

The gateway 141*a* may first transmit the wake-up signal to the second CAN communication unit (b1) on the basis of the received communication signal information, and may transmit a load drive command signal upon transmission completion of the wake-up signal.

That is, upon receiving the communication signal, the gateway 141*a* may transmit the wake-up signal to the second CAN communication unit (b2). After lapse of a predetermined time on the basis of a transmission time of the wake-up signal, the remote signal including the load drive command signal may be transmitted to the second CAN communication unit (b1).

In addition, the communication signal may include a plurality of overlap signals, each of which includes the load drive command signal of the remote signal and the wake-up signal.

In this case, the gateway 141*a* may first transmit the wake-up signal, and may transmit a first drive command signal after lapse of a first predetermined time. After transmission of the first drive command signal, the gateway 141*a* may transmit a second wake-up signal after lapse of a second predetermined time. Thereafter, the gateway 141*a* may transmit the second drive command signal after lapse of the first predetermined time. After transmission of the second drive command signal, the gateway 141*a* may transmit a third wake-up signal after lapse of the second predetermined time. Thereafter, the gateway 141*a* may transmit the third wake-up signal after lapse of the first predetermined time.

The plurality of CAN communication units 141*a* may include the first CAN communication unit (b1), the second CAN communication unit (b2), . . . , the n-th CAN communication unit (bn), and each CAN communication unit may be connected to each drive unit.

In this case, each of the first CAN communication unit (b1) and the second CAN communication (b2) may include a low-speed CAN communication unit. The n-th CAN communication unit (bn) may include a high-speed CAN communication unit having at least a predetermined transfer rate or speed.

The first CAN communication unit (b1) acting as the low-speed CAN communication unit may include a Multimedia Controller Area Network (M-CAN). The second CAN communication unit (b2) may include a body controller area network (B-CAN) to transmit/receive signals for driving various kinds of electronic devices.

The n-th CAN communication unit (bn) acting as the high-speed CAN communication unit may include a power train CAN (P-CAN) communication unit for transmitting/receiving signals needed to real-time control a power train, stability control (ABS, active suspension, etc.), and a gear-shift function, and a chassis CAN (C-CAN) communication unit.

The first CAN communication unit (b1) may receive a communication signal from the control unit 160, and may transmit the received communication signal to the gateway 141*a*.

When transmitting the communication signal to the gateway 141*a*, the first CAN communication unit (b1) may first transmit the wake-up signal. Upon transmission completion of the wake-up signal, the first CAN communication unit (b1) may transmit a load drive command signal and may transmit a copied signal formed by duplication of the received communication signal to the gateway 141*a*.

When the gateway 141*a* transmits the communication signal to the second CAN communication unit (b2), the gateway 141*a* can first transmit the wake-up signal, and then transmit the load drive command signal.

The operation for copying and transmitting the communication signal may include transmitting the load drive command signal to which the wake-up signal is added.

Upon receiving the wake-up signal, the second CAN communication unit (b2) may be activated. Upon receiving the load drive command signal, the second CAN communication unit (b2) may transmit the received drive command signal to the load drive unit 180.

The second communication unit 142 may perform wireless communication with the server, the remote controller, or the user equipment (UE) 2, and may transmit the remote signal received through wireless communication to the control unit 160.

The second communication unit 142 may receive at least one remote signal from among a remote drive ON/OFF signal, a remote lighting ON/OFF signal, a remote air-conditioning adjustment signal, a remote heating-elements ON/OFF signal, and a remote door opening/closing signal during the standby mode in which the vehicle stops driving.

In this case, the second communication unit 142 may include a short distance wireless communication unit, a mobile communication unit, and a wireless LAN (or Wi-Fi) unit.

The short distance wireless communication unit may include a Bluetooth unit, a Near Field Communication (NFC) unit, and a Radio Frequency (RF) unit. The mobile communication unit may include Long Term Evolution (LTE), Code Division Multiple Access (CDMA), and wideband CDMA (WCDMA).

The power-supply unit 150 may provide various electronic devices and various constituent elements with the driving power. If the vehicle stops driving, the power-supply unit 150 may provide the communication module 140 and the control unit 160 with the standby power.

If the vehicle stops driving, the control unit 160 may continuously operate the communication module 140, and the control unit 160 and the storage unit for operating the communication module 140. The control unit 160 may stop operation of various constituent devices embedded in the vehicle.

Upon receiving the remote signal through the second communication unit 142, the control unit may awake and then transmit the wake-up signal to the plurality of CAN communication units of the first communication unit 141.

The control unit 160 may confirm the load drive command signal contained in the remote signal by analyzing the received remote signal, may add the wake-up signal to the confirmed drive command signal to generate a communication signal, and may transmit the generated communication signal to the gateway 141a through the first CAN communication unit (b1).

The drive command signal contained in the remote mode may be the starting ON/OFF signal, the heating-elements ON/OFF signal, the door opening/closing signal, and the air-conditioning adjustment signal.

That is, the control unit 160 may add the wake-up signal prior to a predetermined time from the transmission time of the drive command signal.

In this case, the predetermined time may be shorter than a specific time in which the CAN communication unit awakes and then switches to the sleep mode.

The control unit 160 may also generate a plurality of overlap signals, each of which includes the wake-up signal and the drive command signal, at intervals of a predetermined time.

The control unit 160 may use the first CAN communication unit (b1) as an interface unit such that the first CAN communication unit (b1) can be used as the interface between the control unit 160 and the first communication unit 141 during the remote mode.

The control unit 160 may retransmit the communication signal upon determining that no load operates after transmission of the communication signal.

In this case, the control unit 160 may retransmit the communication signal to the gateway 141a through the first CAN communication unit (b1).

In this case, the communication signal may be retransmitted a predetermined number of times.

The storage unit 170 may store information of the UE 2, and may further store information regarding the remote controller.

The storage unit 170 may store information regarding a predetermined time in which the wake-up signal is added.

The drive unit 180 may be a constituent element to control various electronic devices, and may receive the drive signal from the control unit 160 and may control each electronic device (i.e., load) on the basis of the received drive signal.

The drive unit 180 may include an electronic control unit (ECU) to control various electronic devices.

Figure 5:
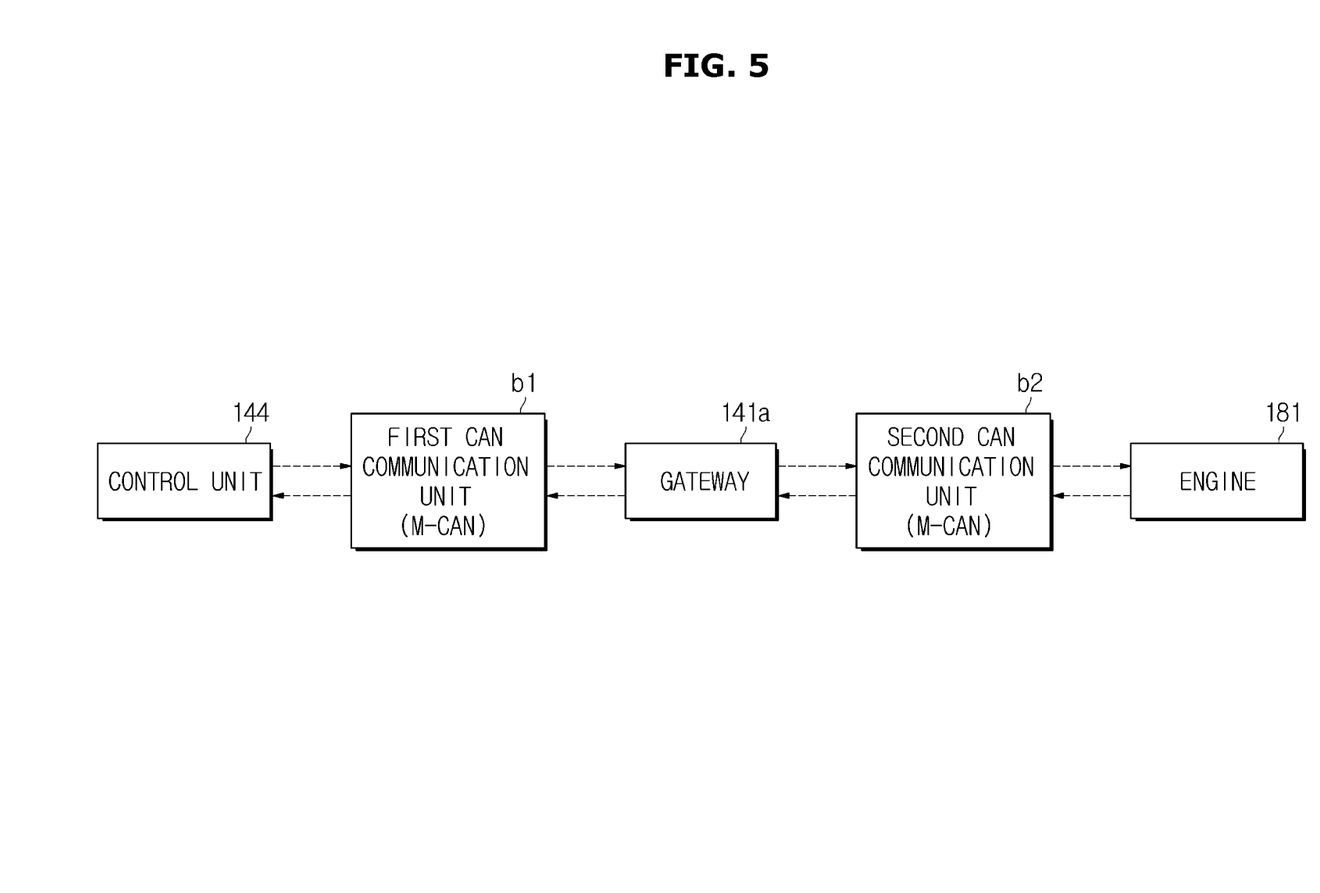
FIG. 5 is a flowchart illustrating an operation of a remote signal between various constituent elements embedded in the vehicle according to an embodiment of the present disclosure.

FIG. 5 is a flowchart illustrating operations of a remote signal for use in the vehicle. The operations of the remote signal shown in FIG. 5 will hereinafter be described with reference to FIGS. 6 to 8. For example, it is assumed that the received remote signal is the starting ON signal.

The control unit 160 may determine whether the remote signal is received through the second communication unit during the standby mode in which the vehicle stops driving. Upon receiving the remote signal, the control unit 160 may transmit the wake-up signal to the plurality of CAN communication units of the first communication unit 141 such that the plurality of CAN communication units can awake and the control unit 160 can analyze the received remote signal.

The control unit 160 may confirm the drive command signal contained in the remote signal, may confirm the load corresponding to the confirmed drive command signal, and may confirm the CAN communication unit (i.e., the second CAN communication unit) configured to transmit the drive command signal to the confirmed load. In this case, the second CAN communication unit may be B-CAN.

The control unit 160 may confirm the CAN communication unit (i.e., the first CAN communication unit) to interconnect the control unit 160 and the gateway 141a. In this case, the first CAN communication unit may be M-CAN.

The control unit 160 may generate a new communication signal by adding the wake-up signal to the confirmed drive command signal.

Figure 6:
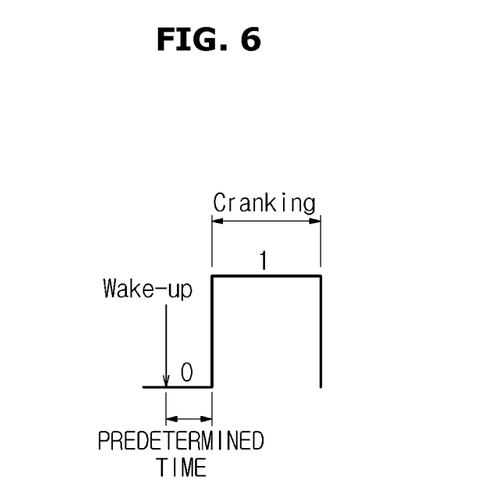
FIGS. 6 and 7 are waveform diagrams illustrating a method for generating communication signals for use in the vehicle according to an embodiment of the present disclosure.

Referring to FIG. 6, the control unit 160 may confirm the transmission time of the drive command signal, and may set a specific time spaced apart from the confirmed transmission time by a predetermined time to the transmission time of the wake-up signal.

That is, the control unit 160 may overlap the wake-up signal with a signal obtained before a predetermined time from the transmission time of the load drive command signal (e.g., the starting signal or the cranking signal), and thus generate a communication signal.

Figure 7:
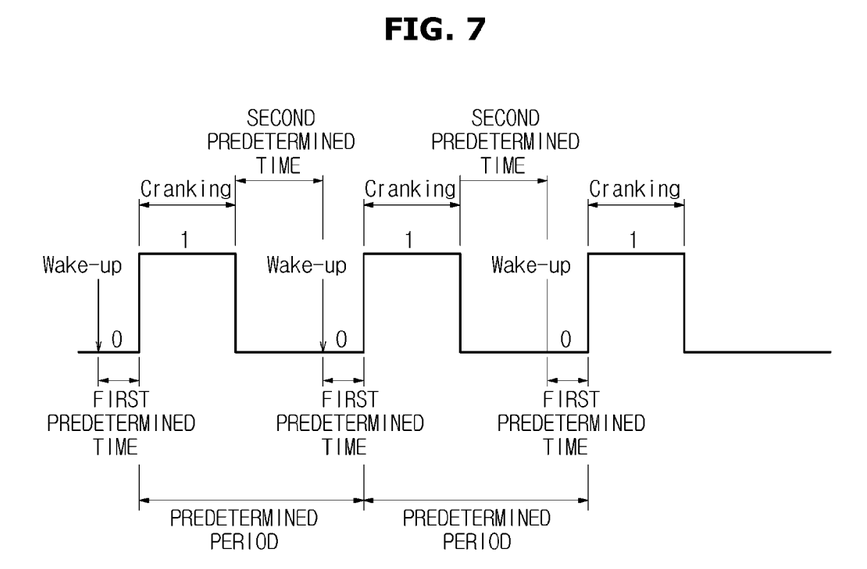

Referring to FIG. 7, the control unit 160 may arrange a plurality of drive command signals (cranking signals) at intervals of a predetermined time, and may overlap the wake-up signal with the signal obtained before a predetermined time from the transmission time of each drive command signal.

That is, the communication signal may include a first wake-up signal, a first drive command signal (e.g., the starting (or cranking) signal) arranged after the first predetermined time on the basis of the transmission time of the first wake-up signal, a second wake-up signal arranged after the second predetermined time on the basis of a transmission completion time of the first drive command signal, a second drive command signal (e.g., the starting (or cranking) signal) arranged after the first predetermined time on the basis of the transmission time of the second wake-up signal, a third wake-up signal arranged after the second predetermined time on the basis of the transmission completion time of the second drive command signal, and a third drive command signal (e.g., the starting (or cranking) signal) arranged after the first predetermined time on the basis of the transmission time of the third wake-up signal.

The control unit 160 may transmit the communication signal to the first CAN communication unit when the first CAN communication unit (b1) awakes.

Upon receiving the wake-up signal, the first CAN communication unit (b1) may awake and be activated, may receive the communication signal, and may transmit the received communication signal to the gateway 141*a*.

The operation for transmitting the communication signal from the first CAN communication unit (b1) to the gateway 141*a* may include transmitting the wake-up signal and transmitting the load drive command signal after lapse of a predetermined time.

When the first CAN communication unit (b1) transmits the communication signal to the gateway 141*a*, the first CAN communication unit (b1) may first transmit the wake-up signal. Upon transmission completion of the wake-up signal, the first CAN communication unit (b1) may transmit the load drive command signal, and may transmit the copied signal obtained by duplication of the received communication signal to the gateway 141*a*.

Upon receiving the wake-up signal, the gateway 141*a* may be activated by performing the wake-up operation, and may receive the drive command signal from among the communication signals.

Upon receiving the drive command signal, the gateway 141*a* may transmit the communication signal in which the received wake-up signal is overlapped with the drive command signal to the second CAN communication unit.

The communication signal in which the wake-up signal is overlapped with the drive command signal may be used as the copied signal.

In other words, the gateway 141*a* may first transmit the wake-up signal to the second CAN communication unit (b1) on the basis of information of the copied signal. Upon transmission completion of the wake-up signal, the gateway 141*a* may transmit the load drive command signal.

Upon receiving the wake-up signal, the second CAN communication unit (b2) may be activated. Upon receiving the load drive command signal, the second CAN communication unit (b2) may transmit the drive command signal to the load drive unit 180.

In this case, the engine acting as the drive unit 180 may receive the drive command signal to drive the motor, such that the user located at a remote site can start driving the vehicle.

Figure 8:
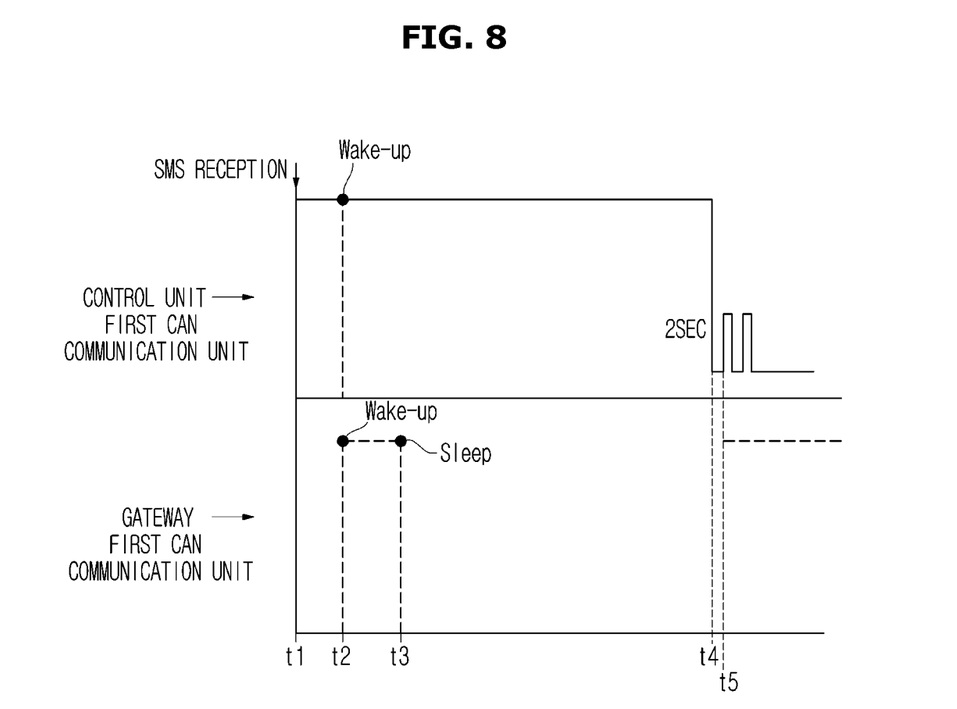
FIGS. 8 and 9 are flowcharts illustrating the operations of communication signals for use in the vehicle according to an embodiment of the present disclosure.

Referring to FIG. 8, if the control unit 160 receives the remote signal (SMS) at a first time (t1), the first CAN communication unit (b1), the gateway 141*a*, and the second CAN communication unit (b2) may awake at a second time (t2) under control of the control unit.

The first CAN communication unit (b1) awakes and then receives the communication signal from the control unit 160.

The control unit 160 may analyze the received remote signal and confirm the drive command signal contained in the remote signal. The control unit 160 may overlap the wake-up signal with the confirmed drive command signal so as to generate the communication signal.

In addition, until the control unit 160 analyzes the remote signal, generates a communication signal and transmits the communication signal to the first CAN communication unit, the control unit 160 continuously transmits a valid communication signal caused by reception of the remote signal to the first CAN communication unit, such that the first CAN communication unit (b1) may maintain the wake-up state and the gateway 141*a* connected to the first CAN communication unit (b1) may also maintain the wake-up state.

Therefore, the first CAN communication unit (b1) and the gateway 141*a* do not switch to the sleep mode before receiving the drive command signal after reception of the wake-up signal, and simultaneously maintain the wake-up state.

However, the second CAN communication unit (b2) may switch to the sleep mode while the control unit analyzes the remote signal and generates/transmits the communication signal, because a predetermined time in which the second CAN communication unit awakes and switches to the sleep mode is shorter than a specific time consumed before the drive command signal is received from the gateway 141*a*.

As a result, the second CAN communication unit may switch to the sleep mode at a third time (t3) elapsed from the wake-up time of the second CAN communication unit by a predetermined time.

The control unit 160 may transmit the wake-up signal at a fifth time (t5) after lapse of the fourth time (t4) at which the communication signal is generated. After lapse of a predetermined time after transmission of the wake-up signal, the control unit 160 may transmit the drive command signal.

Therefore, upon reception completion of the drive command signal, the gateway 141*a* may transmit the received communication signal to the second CAN communication unit (b2), may first transmit the wake-up signal contained in the communication signal to the second CAN communication unit (b2) at a fifth time (t5). After lapse of a predetermined time, the gateway 141*a* may transmit the drive command signal to the second CAN communication unit (b2), and may transmit the remote signal to the second CAN communication unit (b2) without communication errors.

In addition, the communication signal may include a plurality of communication signals, each of which includes the load drive command signal contained in the remote signal and the wake-up signal.

In this case, the gateway 141*a* may first transmit the wake-up signal, and may transmit a first drive command signal after lapse of a first predetermined time. After lapse of a second predetermined time after transmission of the drive command signal, the gateway 141*a* may transmit a second wake-up signal. Thereafter, after lapse of the first predetermined time, the gateway 141*a* may transmit a second drive command signal. After lapse of a second predetermined time after transmission of the second drive command signal, the gateway 141*a* may transmit a third wake-up signal. After lapse of the first predetermined time, the gateway 141*a* may transmit a third drive command signal. A detailed description thereof will hereinafter be given with reference to FIG. 9.

Figure 9:
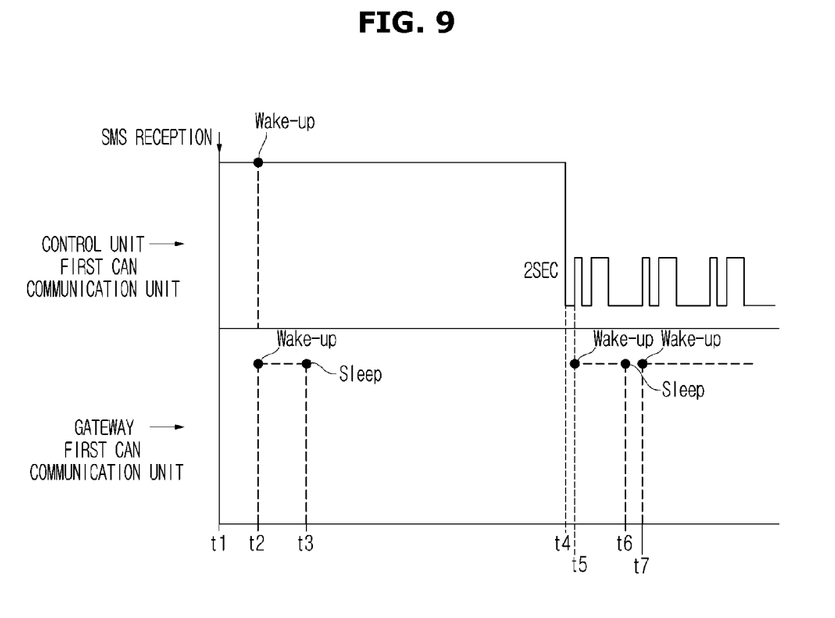

Referring to FIG. 9, when the control unit 160 receives the remote signal (SMS) at the first time (t1), the first CAN communication unit (b1), the gateway 141*a*, and the second CAN communication unit (b2) may awake at the second time (t2) under control of the control unit 160.

After the first CAN communication unit (b1) awakes, the first CAN communication unit (b1) may receive the communication signal from the control unit 160.

The control unit 160 may confirm the drive command signal contained in the remote signal by analyzing the received remote signal, may generate a communication signal by overlapping the wake-up signal with the confirmed drive command signal, and may transmit the generated communication signal to the gateway 141a through the first CAN communication unit (b1).

The control unit 160 may transmit the wake-up signal at the fifth time (t5) located after the fourth time (t4) at which the communication signal is completely generated.

In addition, upon completing generation of the communication signal, the control unit 160 may also immediately transmit the wake-up signal.

In this case, after the gateway 141a awakes at the fifth time (t5) at which the wake-up signal is received and then receives the drive command signal, the gateway 141a may transmit the received communication signal to the second CAN communication unit (b2), and may first transmit the wake-up signal contained in the communication signal to the second CAN communication unit (b2) at the fifth time (t5).

Before the second CAN communication unit (b2) receives the drive command signal from the gateway 141a, the second CAN communication unit (b2) switches to the sleep mode at the third time (t3) elapsed from the second time (t2) (indicating the wake-up time) by a predetermined time, such that the above operations of the gateway 141a are carried out.

In more detail, since the predetermined time in which the second CAN communication unit (b2) awakes and then switches to the sleep mode is shorter than a specific time consumed before the second CAN communication unit (b2) transmits the drive signal, the second CAN communication unit (b2) switches to the sleep mode before receiving the drive command signal from the gateway 141a.

After lapse of a predetermined time after the gateway 141a transmits the wake-up signal, the drive command signal is transmitted to the second CAN communication unit (b2) and the remote signal can be transmitted to the second CAN communication unit (b2) without communication errors.

If the second CAN communication unit (b2) abnormally receives the drive command signal from the gateway 141a, the second CAN communication unit (b2) awakes and then switches to the sleep mode at the sixth time (t6) at which a predetermined time elapses after lapse of the wake-up signal.

Since the second CAN communication unit (b2) switches to the sleep mode, the gateway 141a may retransmit the wake-up signal at a seventh time (t7) so as to prepare for an event in which the drive command signal is not transmitted, may retransmit the wake-up signal, and may retransmit the drive command signal to the second CAN communication unit (b2) after lapse of a predetermined time.

In addition, the gateway 141a may also retransmit the wake-up signal and the drive command signal as necessary.

In addition, the gateway 141a may determine whether the second CAN communication unit is activated. If the second CAN communication unit (b2) is deactivated, the gateway 141a may determine that a current state is the sleep mode, such that it may retransmit the wake-up signal to the second CAN communication unit at the seventh time (t7).

In addition, after the control unit 160 transmits the drive command signal for starting operation of the vehicle, the control unit 160 may confirm a current state of the engine 181. If the engine 181 stops operation, the control unit 160 may retransmit the communication signal through the first CAN communication unit (b1).

After lapse of a predetermined time after the control unit 160 transmits the remote signal to the first communication unit, the control unit 160 may confirm the engine state. If the engine 181 stops operation (i.e., if the engine 181 is in a stationary state), the control unit 160 may also transmit a communication signal to which the wake-up signal is added to the first CAN communication unit.

In accordance with another embodiment, the gateway 141a may generate the wake-up signal upon receiving only the remote signal including the load drive command signal, may transmit the generated wake-up signal to the second CAN communication unit (b2), and may then transmit the remote signal including the load drive command signal after lapse of a predetermined time from the wake-up signal transmission time.

In this case, the gateway 141a may determine whether the second CAN communication unit (b2) is activated. If the second CAN communication unit (b2) is deactivated, the gateway 141a may also retransmit the wake-up signal to the second CAN communication unit (b2).

It should be appreciated that the various illustrative blocks, modules, components, and methods can be implemented as electronic hardware, computer software, or combination thereof. The software including specific algorithms may reside in RAM memory, flash memory, ROM memory, EPROM memory, EEPROM memory, registers, hard disk, a removable disk, a CD-ROM, or any other form of storage medium known in the art.

As is apparent from the above description, the embodiments of the present disclosure can solve a timing issue encountered when signals for the same service are communicated between different communication schemes, thereby guaranteeing stability in a telematics remote service.

As a result, the embodiments can prevent the occurrence of errors in the remote starting, the remote air-conditioning, the remote door opening/closing process, etc.

The embodiments can improve quality of a communication module and vehicle, can increase user satisfaction, and can also improve user convenience.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
 a first communication unit configured to perform wired communication;
 a second communication unit configured to perform wireless communication to receive a remote signal;
 a control unit configured to generate a communication signal by adding a wake-up signal to a drive command signal of the received remote signal upon receiving the remote signal from the second communication unit, and to transmit the generated communication signal to the first communication unit; and
 a drive unit configured to receive the communication signal from the first communication unit, and to drive load on the basis of a drive command signal of the received communication signal,
 wherein the first communication unit includes: a gateway; at least one first CAN communication unit configured to interconnect the control unit and the gateway; and at least one second CAN communication unit configured to interconnect the drive unit and the gateway, and wherein the at least one first CAN communication unit transmits a copied signal obtained by duplication of the communication signal.

2. The vehicle according to claim 1, wherein the control unit determines a specific time before a predetermined time on the basis of a transmission time of the drive command signal to be a transmission time of the wake-up signal.

3. The vehicle according to claim 1, wherein the control unit generates a predetermined number of communication signals, each of which includes the wake-up signal and the drive command signal.

4. The vehicle according to claim 1, wherein the control unit awakes upon reception of the remote signal, and then transmits a wake-up signal to the first communication unit.

5. The vehicle according to claim 1, wherein the gateway receives a communication signal from the at least one first CAN communication unit, and transmits a wake-up signal contained in the communication signal to the at least one second CAN communication unit.

6. The vehicle according to claim 5, wherein:
after lapse of a predetermined time after the gateway transmits the wake-up signal, the gateway transmits the drive command signal to the at least one second CAN communication unit.

7. The vehicle according to claim 5, wherein the at least one second CAN communication unit performs a wake-up operation upon receiving the wake-up signal, and transmits a drive command signal to the drive unit upon receiving the drive command signal.

8. The vehicle according to claim 1, wherein the gateway further transmits a predetermined number of communication signals to the at least one second CAN communication unit at intervals of a predetermined time.

9. The vehicle according to claim 1, wherein each of the at least one first CAN communication unit and the at least one second CAN communication unit includes a communication speed equal to or less than a predetermined speed.

10. The vehicle according to claim 1, wherein the remote signal includes any one of a remote starting signal, a remote door opening/closing signal, a remote air-conditioning adjustment signal, and a remote lighting signal.

11. A communication module comprising:
a first CAN communication unit connected to an external control unit for receiving a remote signal, configured to receive a communication signal from the external control unit;
a second CAN communication unit connected to drive a load; and
a gateway connected to the first CAN communication unit and the second CAN communication unit, configured to receive the communication signal from the first CAN communication unit and to transmit the received communication signal to the second CAN communication unit,
wherein the communication signal includes a wake-up signal and a load drive command signal contained in the remote signal, and
wherein the first CAN communication unit transmits a copied signal obtained by duplication of the communication signal.

12. The communication module according to claim 11, wherein the gateway transmits the wake-up signal to the second CAN communication unit, and transmits the drive command signal after lapse of a predetermined time.

13. A communication module comprising:
a gateway;
a first CAN communication unit configured to receive a communication signal from an external control unit, to awake by a wake-up signal of the received communication signal and to transmit a drive command signal of the received communication signal to the gateway; and
a second CAN communication unit configured to connect a drive unit for driving a load to the gateway,
wherein the gateway generates the wake-up signal upon receiving the drive command signal, transmits the generated wake-up signal to the second CAN communication unit, and transmits the received drive command signal to the second CAN communication unit after lapse of a predetermined time, and
wherein the first CAN communication unit transmits a copied signal obtained by duplication of the received communication signal.

14. The communication module according to claim 13, wherein the gateway further transmits the wake-up signal and the drive command signal to the second CAN communication unit at intervals of the predetermined time.

15. The communication module according to claim 13, wherein each of the first CAN communication unit and the second CAN communication unit includes a communication speed equal to or less than a predetermined speed.

16. The communication module according to claim 13, wherein the second CAN communication unit performs a wake-up operation upon receiving the wake-up signal, and transmits the received drive command signal to the drive unit upon receiving the drive command signal.

17. The communication module according to claim 13, wherein the gateway retransmits the wake-up signal when the second CAN communication unit is deactivated.

* * * * *